Aug. 25, 1970     H. J. STRAUSS     3,525,647

SEAL FOR WAFER CELLS

Filed Jan. 14, 1969

Inventor
Howard J. Strauss
By
Darby, Robertson & Vandenburgh
Att'ys.

United States Patent Office 3,525,647
Patented Aug. 25, 1970

---

3,525,647
SEAL FOR WAFER CELLS
Howard J. Strauss, Rockford, Ill., assignor to Clevite Corporation, Cleveland, Ohio, a corporation of Ohio
Filed Jan. 14, 1969, Ser. No. 790,944
Int. Cl. H01m 21/00
U.S. Cl. 136—111            7 Claims

ABSTRACT OF THE DISCLOSURE

An electrical battery is provided comprising a stack of wafer or flat cells, particularly cells utilizing an alkaline electrolyte. An improved seal is provided between the electrodes or terminals of each cell and the adjacent integument covering at the periphery of apertures provided in the covering to permit electrical contact to be made between adjacent cells. The seal comprises a complete ring of an adhesive bonding the film or integument covering to the electrode or terminal about the aperture. Additionally, an electrolyte-absorbent material, as for example carboxymethylcellulose, in the form of a dry film, completely surrounds the adhesive seal. Any electrolyte which leaks around the edges of the electrode or terminal and which might otherwise penetrate an area where the seal between the adhesive and electrode surface is imperfect is instead absorbed and retained by the absorbent material, thereby preventing any attack of the leaking electrolyte upon the electrical connection to the cell.

BACKGROUND OF THE INVENTION

This invention relates to primary electric batteries comprised of wafer-type or flat-type cells, and more particularly refers to batteries having an improved seal and other means for preventing leakage between particular cell elements and the outer covering of the cell.

Alkaline cells have become of great commercial importance due to their excellent characteristics, many of which are not realized in cells employing other types of electrolytes. Alkaline cells can provide a high current discharge capacity under continuous load for a relatively long period. Moreover, alkaline cells generally have a substantially more uniform voltage discharge curve. Additionally, they have a relatively high ratio of current capacity to cell volume, and are not as greatly affected by changes in temperature. Such alkaline cells generally comprise an anode of zinc or any other suitable anodic metal or anodic compound; and a depolarizer of manganese dioxide, mercuric oxide, silver oxide, or nickel compounds, and in most cases having finely divided graphite dispersed therein. The electrolyte utilized is generally an aqueous solution of potassium hydroxide which may contain a substantial amount of an alkali metal zincate dissolved therein.

One type of battery construction which has been found useful for batteries utilizing an alkaline electrolyte is the so-called wafer- or flat-type cell construction, particularly where the size or shape of the battery is an important factor. Depolarizer or cathode elements in the form of flat cakes or pellets have proven to be substantially more efficient than cylindrical elements of the same volume. Moreover, flat cells may be so stacked in a rectangular space that substantially all of the space is occupied by active ingredients. Cylindrical cells, in contrast, when stacked upon one another, cause an inherent waste of space due to the curvature of the cells.

In spite of their excellent potential properties, alkaline batteries formed of flat cells have an inherent leakage problem in that the alkaline electrolyte has a strong tendency to leak around seals which would normally resist leakage by neutral or acid electrolytes. This problem is particularly acute at the zone where external electrical contact is provided with the cell elements.

Various means and methods have been utilized in the prior art to prevent an alkaline electrolyte from leaking out of the cell. One method has been to provide an adhesive ring surrounding the aperture provided in the outer covering or integument of the cells to seal the terminal element such as the cathode collector or the anode to the integument at the periphery of the aperture. Such means has been found effective in laboratory prototype cells where a very clean adhesive surface can be provided on the cathode collector plate. However, in commercial practice, it is often necessary in the manufacture of the cathode cake or pellet to utilize high compression of a lubricated mix. As a result, the sealing surface of the cathode collector plate frequently become contaminated even when various cleaning methods are used to provide a clean surface. As a result, adhesive seals with the cathode collector plate and with the cell integument are often imperfect, thereby permitting a small amount of alkaline electrolyte to leak through the imperfect seal and to destroy the external electrical connection.

SUMMARY OF THE INVENTION

It is an object of the present invention to provide a dry cell battery formed of flat- or wafer-type cells.

It is a further object to provide a dry cell battery of the type described utilizing an alkaline electrolyte.

It is still a further object to provide a dry cell battery having an alkaline electrolyte wherein protection is provided against leakage of the electrolyte through the seal between the cell element and its outer covering, particularly in the areas where external electrical connection is made between the cell elements of adjacent cells.

Other objects and advantages of the invention will become apparent from the following discussion and from the drawing.

According to the invention, an alkaline cell of the plate-, flat-, or wafer-type structure is provided which is suitable for use in assembling a battery of linearly stacked cell units, each of the cells having a plurality of flat cell elements positioned in superposed relationship. Each cell is comprised of a sheet-form anode, a cathode in the form of a depolarizer cake or pellet, a bibulous separator having one surface engaging the anode and the other surface engaging the cathode, an electrolyte contained in the separator, a cathode current collector plate engaging the cathode, and a non-conductive electrolyte-resistant integument enclosing the cell elements and having an aperture provided therein at each end of the cell for permitting electronic connection between adjacent cell units. A ring of an adhesive material is provided between the integument and the cathode current collector plate at the periphery of the aperture provided in the integument, thereby sealing the integument to the collector plate. Another ring of adhesive material is interposed between the integument and the anode at the periphery of the aperture provided in the integument. Additionally, according to the invention, a layer of an electrolyte-absorbent material is interposed between the integument and the cathode current collector radially external to and surrounding the adhesive ring sealing the integument to the collector. Also, if desired, a similar layer of electrolyte-absorbent material may be placed between the anode and the integument. As a result, any electrolyte which leaks from the cell elements due to faulty sealing to the integument is absorbed and retained by the absorbent layer, thereby preventing the electrolyte from attacking and impairing electrical connection between the cell elements and elements or terminals of an adjacent cell.

DESCRIPTION OF THE PREFERRED EMBODIMENTS

Figure 1:
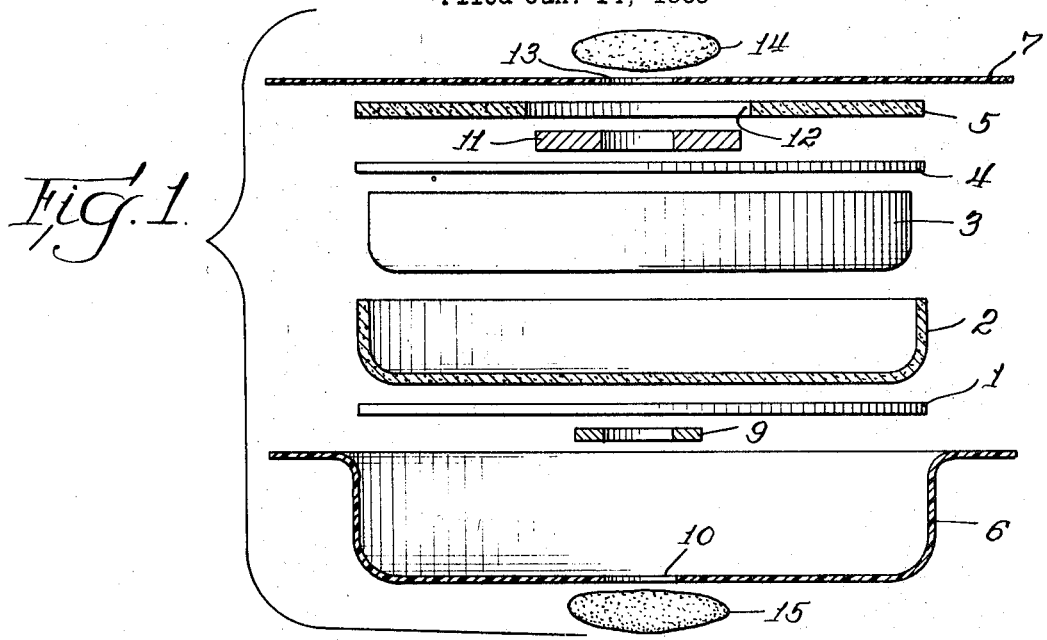
FIG. 1 is an exploded cross-sectional view of a cell according to the invention.
Figure 2:
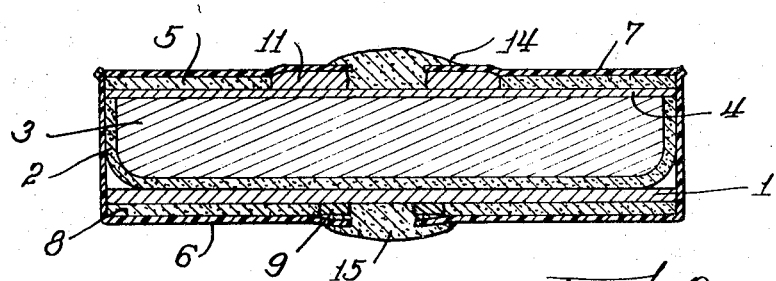
FIG. 2 is a cross-sectional view of a completed cell.

FIG. 1 illustrates a cell according to the invention in exploded view, comprising an anode 1 of an anodic metal such as zinc, magnesium, cadmium or other suitable anodic metals or compounds, an electrolyte-absorbent separator 2, a cathode depolarizer pellet 3, a cathode current collector 4, and an electrolyte-absorbent member 5. The outer enclosure or integument for the cell comprises plastic film sheets 6 and 7. In the assembly of FIG. 2, a second electrolyte-absorbent member 8, not included in FIG. 1, is employed at the anode seal.

In assembling the elements to form the cell shown in FIG. 2, electrolyte-absorbent member and anode 1 are placed upon the plastic film sheet 6 and the anode is adhered thereto by means of a ring of sealing material 9 such as asphalt surrounding an aperture 10 provided in the center of the plastic film sheet 6. The separator 2 having the cathode 3 placed therein is inserted in contact with the anode 1 and the cathode current collector 4 placed over the cathode 3. The electrolyte-absorbent member 5 is then placed over the cathode collector 4 and the plastic film sheet 7 then adhesively affixed to the cathode current collector by means of an adhesive sealing ring 11 which is positioned inside an aperture 12 provided in the center of the absorbent member 5, the adhesive 11 surrounding an aperture 13 provided in the plastic film sheet 7. The flange of the plastic film sheet 7 is then heat-sealed to the flange of the plastic film sheet 6 to complete the sealing of the cell. In order to provide electrical connection with the cathode collector 4 and anode 1, electrically conductive beads 14 and 15 are applied in molten form through the apertures 13 and 10 and through the apertures of the sealing rings 9 and 11, and adhered to the current collector 4 and anode 1, respectively.

Figure 3:
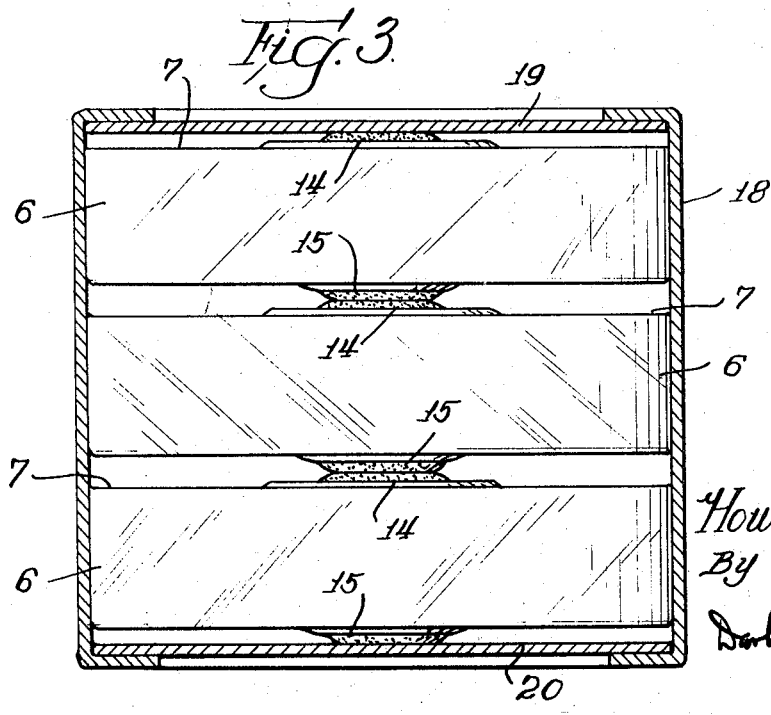
FIG. 3 is an elevational view, partly in section, of a battery formed of a plurality of stacked cells similar to that shown in FIGS. 1 and 2.

FIG. 3 illustrates a battery formed by placing a plurality of cells such as shown in FIG. 2 in superposition. An integument 18 is then placed over the stack and heat sealed over at the end to maintain the cells under sufficient pressure to maintain good electrical contact therebetween. Terminal plates 19 and 20 of a conductive metal such as brass or zinc provide external electrical connection.

During operation and even on standing, there is a tendency for the cell electrolyte contained in the depolarizer cathode, particularly when an alkaline electrolyte is used, to leak around the element such as the cathode collector and to pass through apertures provided in the cell integument, at which point the electrolyte is in a position to attack the intercell electrical connection. To some extent an adhesive sealing ring, as for example 11, is provided to prevent such leakage. However, although adequate seals of this type can always be made in a hand-assembled cell, it has been found in practice that when the cells are automatically assembled by a machine, there is a tendency for sufficient foreign particles to be entrapped in the seal, causing the seal to fail. The absorbent member 5 is therefore provided. As excess electrolyte escapes from the cathode 3, it travels around the edge of the current collector 4 and subsequently in the space between the current collector 4 and the plastic film sheet. In order to reach the seal 11 and to escape through the aperture provided in the plastic sheet 7, the electrolyte first encounters the absorbent member 5. Here the electrolyte becomes trapped by the absorbent member and is prevented from traveling to the seal. It has been found in practice that the presence of the absorbent member 5 has caused a marked reduction in the failure of flat cell batteries, particularly those utilizing alkaline electrolytes, as compared to cells not so constructed. While it has been found that generally it is sufficient to utilize the absorbent member only at the cathode seal since this is where the most serious leakage occurs, if desired, and for further insurance, an absorbent member 8 (FIG. 2) may also be placed between the anode 1 and the plastic film 6, and surrounding the seal 9. The cathode has a considerable amount of free electrolyte associated with it, which has a tendency to creep around the edges of the cathode, although this situation is not true at the anode end of the cell since there is not a significant amount of free electrolyte associated therewifth. However, the absorbent member structure can be used in conjunction with the anode end if desired, in addition to that placed at the cathode end.

The absorbent members may be applied by painting a solution of carboxymethylcellulose contained in a solvent on the cathode collector and anode plate around the asphalt seal directly, and permitting the solution to dry. Alternatively, the carboxymethylcellulose may be applied as a cast or rolled film, or coated on a suitable cellulosic material such as kraft paper or Webril, a non-woven cellulosic absorbent paper product. The absorbent members may be formed of any suitable material which is inert to and absorbent of the particular electrolyte utilized. Carboxymethylcellulose or its sodium salt has been found to be the preferred material since it has an exceedingly high capacity for absorbing caustic electrolytes, and in addition immobilizes them to a high degree, particularly when applied on a paper base. However, other materials such as various starches and gels may also be used. Other suitable materials are cellulosic papers such as kraft paper, either uncoated or coated with other absorbing materials such as vinyl acetate, and vinyl alcohol.

Any of the common electrolytes used for alkaline cells may be used for the cells of the present invention. Among such electrolytes are aqueous solutions of potassium hydroxide, sodium hydroxide, etc., and generally containing a certain amount of sodium or potassium zincate dissolved therein. Additionally ammonium chloride electrolytes, such as those used in Leclanche cells may be used in conjunction with various gelling agents, as for example carboxymethylcellulose and starch.

The cathode may be any type commonly used in the art. One suitable composition comprises a mixture of about 90% manganese dioxide with about 10% of a finely particulate carbonaceous material such as graphite or acetylene black. Another suitable material is a composition of mercuric oxide with a carbonaceous material. Additionally, cathodic materials such as silver oxide or nickel oxide may be used.

The anode may be prepared from any suitable anodic material compatible with the cathode and with the particular electrolytes used. Sheet-form zinc is an excellent anodic material. Other suitable materials are magnesium, aluminum, and cadmium oxide.

The cathode collector plate 4, particularly when utilized in an alkaline cell should be of an electrically conductive metal which does not react with the cell electrolyte, and should additionally have sufficient strength and rigidity to support the cathode 3. Steel is a suitable material for alkaline cells. In the case of the Leclanche cell, films of conductive plastic compositions containing graphite are generally used, which films may be supported by a metal backing to provide adequate mechanical strength. Alternatively, in the case of the so-called "duplex cell," the plastic graphite composition may be applied to the back of the anode sheet of an adjacent cell.

Any suitable type of electrical connecting means may be used to connect adjacent cells together electrically. A preferred material is a mixture of silver powder or copper-plated silver powder dispersed in a wax, such as disclosed and claimed in U.S. Pat. 2,566,803.

The film used for the cell enclosure may be any of those commonly used, as for example Pliofilm, a trademarked product comprised of rubber hydrochloride. Other suitable materials are vinyl chloride, polyethylene, polypropylene, etc.

The individual cells may be assembled into batteries by commonly known methods and utilizing commonly known materials for enclosures and terminals.

Although the present invention has been described in only a few embodiments, variations thereof may be practiced by those skilled in the art without departing from the spirit or scope of the invention as defined in the appended claims.

Invention is claimed as follows:

1. A cell adapted to be placed in stacked relationship to form a battery, said cell comprising a plurality of flat cell elements in superposed relationship comprising a sheet-form anode, a cathode, a bibulous separator having electrolyte absorbed therein and having one surface engaging said anode and the other surface engaging said cathode, a cathode current collector, a non-conductive electrolyte-resistant integument enclosing said cell elements and having an aperture at each end of said cell, means for providing electronic connection between adjacent cells positioned over each of said apertures and electrically connected to a cell element, a ring of an adhesive material interposed between said anode and the adjacent portion of said integument completely encircling the aperture provided therein and sealing said anode to said integument, a ring of an adhesive material interposed between said cathode current collector and another portion of said integument completely encircling the other of said apertures and sealing said current collector to said integument, and an electrolyte-absorbent member provided intermediate said current collector and said integument positioned radially outwardly of and surrounding said adhesive ring and adapted to absorb and retain electrolyte escaping from said cell elements and to prevent said electrolyte from penetrating through any imperfections which may be present in the adhesive seal between said integument and said current collector.

2. A cell according to claim 1 wherein said electrolyte-absorbent member comprises a sheet of electrolyte-absorbent paper.

3. A cell according to claim 1 wherein said electrolyte-absorbent member comprises a film of carboxymethylcellulose or its sodium salt.

4. A cell according to claim 1 wherein said electrolyte-absorbent member comprises a sheet of an electrolyte-absorbent paper containing carboxymethylcellulose or its sodium salt.

5. A cell according to claim 1 wherein said electrolyte-absorbent member comprises starch.

6. A cell according to claim 1 wherein said electrolyte comprises an aqueous solution of potassium hydroxide.

7. A cell according to claim 1 and including an electrolyte-absorbing member arranged between said anode and said integument and surrounding said ring of adhesive material at said anode to absorb and retain electrolyte escaping from said cell elements and prevent electrolyte from penetrating through any imperfections which may be present in the adhesive seal between said integument and said anode.

References Cited

UNITED STATES PATENTS

| | | | |
|---|---|---|---|
| 3,306,777 | 2/1967 | Reid et al. | 136—111 |
| 3,442,709 | 5/1969 | Yoshio Hayase | 136—111 |
| 3,442,716 | 5/1969 | Ichiko Muraki et al. | 136—133 |
| 3,457,117 | 7/1969 | Angelovich | 136—111 |

WINSTON A. DOUGLAS, Primary Examiner

C. F. LEFEVOUR, Assistant Examiner

U.S. Cl. X.R.

136—133